United States Patent [19]
Cluff, Sr. et al.

[11] 3,861,288
[45] Jan. 21, 1975

[54] MOBILE BARBECUE PIT

[76] Inventors: Exie Cluff, Sr.; Alsie Cluff, Sr., both of P.O. Box 261, Corrigan, Tex. 75939

[22] Filed: July 26, 1973

[21] Appl. No.: 382,765

[52] U.S. Cl. ........................ 99/357, 99/339, 99/446
[51] Int. Cl. ........................................... A47j 37/07
[58] Field of Search ............... 99/357, 339–340, 99/443, 444, 446, 450; 62/331; 126/37; 137/625.11, 625.21; 221/129, 150, 192, 298; 222/108, 146; 126/11

[56] References Cited
UNITED STATES PATENTS

| | | |
|---|---|---|
| 2,851,941 | 9/1958 | Cogar .............................. 99/339 X |
| 2,926,504 | 3/1960 | Hellinger ........................ 62/331 X |
| 3,025,782 | 3/1962 | Stall .................................... 99/339 |
| 3,482,509 | 12/1969 | Gardner............................... 99/357 |
| 3,653,541 | 4/1972 | Crum .............................. 99/357 X |

*Primary Examiner*—Robert L. Bleutge
*Assistant Examiner*—Arthur O. Henderson

[57] ABSTRACT

A mobile barbecue pit having a wheeled frame adapted to be pulled like a trailer. A fire box is disposed on the frame at the front and is surmounted by a grill. A chamber at the rear of the frame is provided with a smoke stack. A hollow chamber is disposed between the box and the chamber and conducts heat and gases from box to stack. The compartment has means to support meat for barbecuing.

1 Claim, 3 Drawing Figures

PATENTED JAN 21 1975　　　　　　　　　　　　　　　3,861,288

MOBILE BARBECUE PIT

SUMMARY OF THE INVENTION

Our invention is directed toward a mobile barbecue pit in which meat can be barbecued without scorching or burning.

A wheeled frame adapted to be pulled by a vehicle like a trailer has a fire box surmounted by a grill at the front end, a chamber having a smoke stack communicating therewith at the rear end, and a hollow compartment disposed between the fire box and the chamber.

When charcoal is burned in the fire box meat can be cooked over the coals on the grill in conventional manner. The heat and gases are conducted from the box through the compartment to the chamber for discharge through the stack.

Means in the compartment support meat in the heat flow path. The flow of heat is used in barbecuing the meat, but since this meat does not overlie the coals, it cannot be burned or scorched.

DETAILED DESCRIPTION OF PREFERRED EMBODIMENTS

Figure 1:
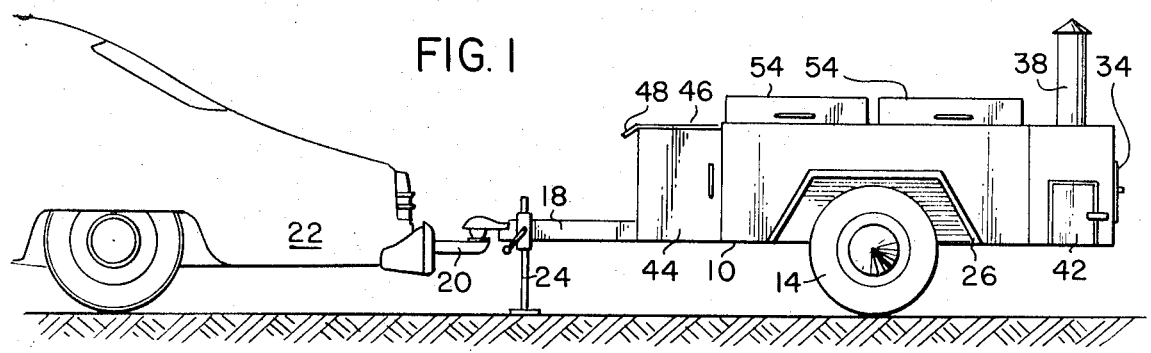
FIG. 1 is a side view of my invention.
Figure 2:
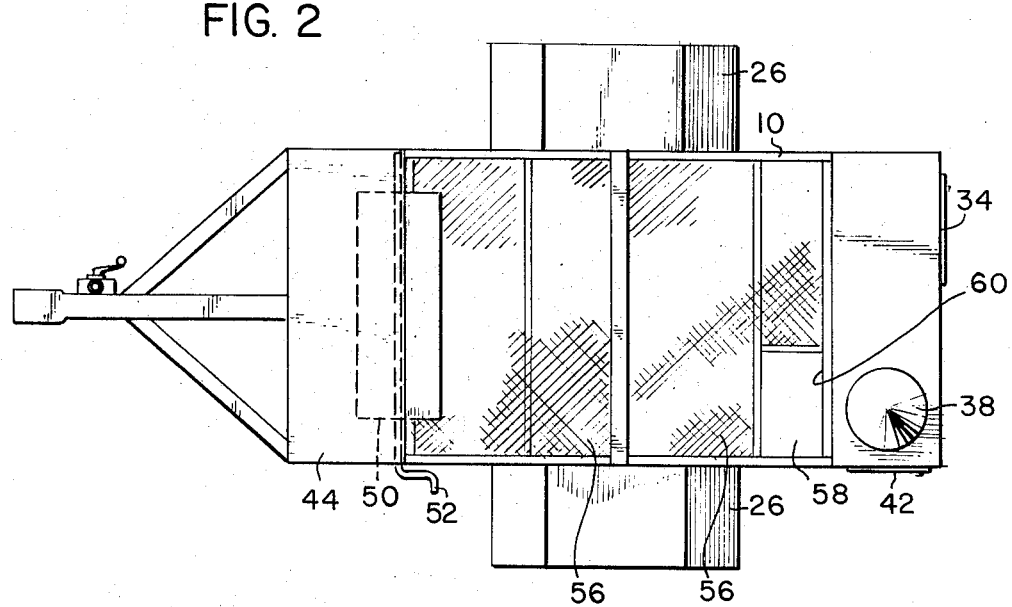
FIG. 2 is a cut away top view thereof.
Figure 3:
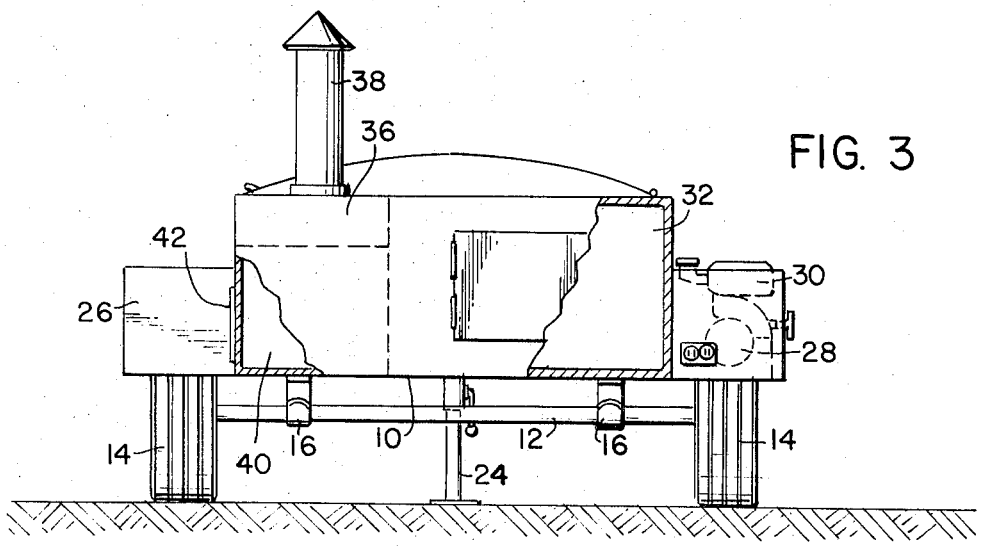
FIG. 3 is an end view thereof.

Referring now to FIGS. 1–3, a horizontal rectangular frame 10 has a transverse rear horizontal axle 12 with wheels 14 and supported by springs 16 secured to the axle. A front coupler 18 connects detachably to rear coupler 20 of vehicle 22. A detachable stand 24 holds the frame upright when vehicle and frame are not in motion.

Fenders 26 are disposed over the wheels. An electric motor 28 adapted for electrical connection to an external source and a compresser 30 driven by the motor is disposed in a section in one fender.

A hollow structure surmounts the frame. At the rear, the structure includes a freezer section 32 having door 34 and cooled by the adjacent compresser. Disposed at the rear next to section 32 is a chamber 36 surmounted by connected smoke stack 38 with storage section 40 disposed therebelow and accessible via door 42.

At the front of the structure, fire box 44 containing burning charcoal or the like is surmounted by grill 46 having drain 48.

The fire box communicates with vent 50 controlled in any position between open and closed via handle 52.

A central hollow region covered by removable lids 59 disposed above grates 56 connects the fire box to chamber 36. A sauce pot 58 can be removably disposed in recess 60 of chamber 36.

Meat disposed on the grates is not disposed directly above the fire and will not be burned or scorched during barbecuing, the heat flowing between the fire box and the smoke stack being sufficient for barbecues.

Meat can be grilled over the charcoal in conventional manner via grill 46.

While we have described our invention with particular reference to the drawings, such is not to be considered as limiting its actual scope.

Having thus described this invention, what is asserted as new is:

1. A mobile barbecue pit comprising:
   a wheeled frame having means at one end detachably engageable with a rear disposed coupling of a vehicle whereby the frame can be pulled from place to place, said frame having fender means disposed over the wheels, one fender means having a section adapted to receive a compressor;
   a fire box mounted on the frame at the front end;
   a grill disposed over the box;
   a chamber at the rear of the frame surmounted by a smoke stack, said stack extending vertically upwards above the frame;
   a hollow compartment disposed between the box and chamber and conducting heat and gases from the box to the stack, the hollow compartment having removable grates to support meat for barbecuing;
   additional storage and freezer compartments spaced from each other and from the hollow compartment;
   freezer means in the freezer compartment; and
   a compressor for operating the freezer means and disposed in said fender means section.

* * * * *